US010256954B2

(12) United States Patent
Li et al.

(10) Patent No.: US 10,256,954 B2
(45) Date of Patent: Apr. 9, 2019

(54) DATA TRANSMISSION METHOD, DEVICE AND SYSTEM FOR DOWNLINK VIRTUAL MULTI-ANTENNA SYSTEM (71) Applicant: ZTE Corporation, Shenzhen, Guangdong (CN)

(72) Inventors: Yu Ngok Li, Shenzhen (CN); Jin Xu, Shenzhen (CN); Jun Xu, Shenzhen (CN); Liujun Hu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 206 days.

(21) Appl. No.: 14/894,652

(22) PCT Filed: Apr. 16, 2014

(86) PCT No.: PCT/CN2014/075537
§ 371 (c)(1),
(2) Date: Nov. 30, 2015

(87) PCT Pub. No.: WO2014/190822
PCT Pub. Date: Dec. 4, 2014

(65) Prior Publication Data
US 2016/0112170 A1 Apr. 21, 2016

(30) Foreign Application Priority Data
May 31, 2013 (CN) .......................... 2013 1 0213738

(51) Int. Cl.
*H04L 5/00* (2006.01)
*H04L 25/02* (2006.01)
(52) U.S. Cl.
CPC ........ *H04L 5/0048* (2013.01); *H04L 25/0204* (2013.01); *H04L 25/0226* (2013.01)

(58) Field of Classification Search
None
See application file for complete search history.

(56) References Cited

U.S. PATENT DOCUMENTS 7,697,904 B2    4/2010  Park
7,983,302 B2 *  7/2011  Doppler ............... H04L 1/1607
                                                  370/442
(Continued)

FOREIGN PATENT DOCUMENTS

CN      101047423 A    10/2007
CN      101141165 A     3/2008
(Continued)

OTHER PUBLICATIONS

International Search Report in international application No. PCT/CN2014/075537, dated Jul. 9, 2014.
(Continued)

*Primary Examiner* — Andrew C Oh
(74) *Attorney, Agent, or Firm* — Oppedahl Patent Law Firm LLC (57) ABSTRACT Disclosed are a method, apparatus and system for data transmission in a downlink virtual multi-antenna system. The method includes: N terminals receive downlink data and/or downlink Demodulation Reference Signals (DMRSs) from one Node B or multiple Nodes B, N being a positive integer larger than or equal to 2; and one terminal in the N terminals forwards the downlink data and/or downlink DMRSs received from the one Node B or multiple Nodes B to M terminal(s), M being a positive integer larger than or equal to 1. A first forwarding unit of the apparatus is configured to forward received downlink data and/or downlink DMRSs of a Node B to M terminal(s) by one terminal in N terminals, M being a positive integer larger than or equal to 1.

18 Claims, 5 Drawing Sheets

(56) References Cited

U.S. PATENT DOCUMENTS

| | | | |
|---|---|---|---|
| 8,923,304 B2* | 12/2014 | Kim | H04B 7/15528 370/315 |
| 2003/0236069 A1* | 12/2003 | Sakata | H04W 84/18 455/11.1 |
| 2004/0114618 A1 | 6/2004 | Tong | |
| 2004/0131025 A1* | 7/2004 | Dohler | H04B 7/2606 370/328 |
| 2007/0129008 A1* | 6/2007 | Shi | H04B 7/15585 455/11.1 |
| 2008/0032746 A1 | 2/2008 | Olesen | |
| 2010/0014453 A1* | 1/2010 | Erkip | H04B 7/026 370/315 |
| 2010/0080166 A1* | 4/2010 | Palanki | H04B 7/2606 370/315 |
| 2010/0110968 A1* | 5/2010 | Lee | H04B 7/2606 370/315 |
| 2010/0234071 A1* | 9/2010 | Shabtay | H04B 7/0408 455/562.1 |
| 2010/0303034 A1 | 12/2010 | Chen | |
| 2010/0323684 A1* | 12/2010 | Cai | H04B 7/2606 455/422.1 |
| 2011/0159801 A1* | 6/2011 | Maltsev | H04W 52/10 455/7 |
| 2011/0244788 A1* | 10/2011 | Ode | H04B 7/022 455/7 |
| 2012/0082110 A1 | 4/2012 | Su | |
| 2012/0093061 A1* | 4/2012 | Charbit | H04B 7/15557 370/315 |
| 2012/0201190 A1 | 8/2012 | Sawai | |
| 2012/0213148 A1* | 8/2012 | Saito | H04B 7/15542 370/315 |
| 2012/0293885 A1* | 11/2012 | Kosugi | G11B 20/10222 360/51 |
| 2013/0064169 A1* | 3/2013 | Song | H04B 7/155 370/315 |
| 2013/0229931 A1* | 9/2013 | Kim | H04W 24/10 370/252 |
| 2014/0003264 A1* | 1/2014 | Shin | H04B 7/0689 370/252 |
| 2014/0056209 A1* | 2/2014 | Park | H04W 16/26 370/315 |
| 2014/0169261 A1* | 6/2014 | Ming | H04W 88/04 370/315 |
| 2014/0173372 A1* | 6/2014 | Maaref | H04L 1/1816 714/751 |
| 2015/0304014 A1* | 10/2015 | Sadeghi | H04J 13/004 370/315 |
| 2015/0358973 A1* | 12/2015 | Zeger | H04L 5/16 370/329 |

FOREIGN PATENT DOCUMENTS

| | | |
|---|---|---|
| CN | 101472286 A | 7/2009 |
| CN | 101502020 A | 8/2009 |
| CN | 101873161 A | 10/2010 |
| CN | 101883075 A | 11/2010 |
| CN | 101931936 A | 12/2010 |
| CN | 101964676 A | 2/2011 |
| CN | 102511184 A | 6/2012 |
| CN | 102882566 A | 1/2013 |

OTHER PUBLICATIONS

English Translation of the Written Opinion of the International Search Authority in international application No. PCT/CN2014/075537, dated Jul. 9, 2014.

Research on Virtual MIMO Techniques in Wireless Communication Systems, mailed on Dec. 2009.

Cooperative Communication Using a Virtual MIMO System with a Feedback Channel for Uplink Transmission in Cellular Radio, mailed on Apr. 2009.

A novel cooperative Virtual-MIMO structure using Random Network Coding, mailed on Dec. 2010.

Text proposal for virtual MIMO for UL OFDMA, mailed on Oct. 10, 2005.

Text proposal for virtual MIMO for UL OFDMA and UL SC-FDMA, mailed on Oct. 10, 2005.

Virtual MIMO with Antenna Selection for Mobile Cellular Communications, mailed in Oct. 2008.

\* cited by examiner

DATA TRANSMISSION METHOD, DEVICE AND SYSTEM FOR DOWNLINK VIRTUAL MULTI-ANTENNA SYSTEM

TECHNICAL FIELD

The present disclosure relates to a data transmission technology in the field of communication, and in particular to a method, apparatus and system for data transmission in a downlink virtual multi-antenna system.

BACKGROUND

In a wireless communication technology, when a Node B, for example, an Evolved Node B (eNB), sends data by multiple antennae, a data transmission rate may be increased in a space multiplexing manner, that is, a sender sends different data at different antenna locations by the same time-frequency resources, and a receiver, for example, User Equipment (UE), also receives the data by multiple antennae. Under a single-user condition, resources of all antennae are allocated to the same user, the user is in possession of all the physical resources allocated by a Node B in a transmission interval, and such a transmission manner is called Single User Multiple-Input Multiple-Output (SU-MIMO); and under a multiple-user condition, space resources of different antennae are allocated to different users, one user shares the physical resources allocated by the Node B side with at least one of the other users in a transmission interval, a sharing manner may be a space division multiple access manner or a space division multiplexing manner, and such a transmission manner is called Multiple User Multiple-Input Multiple-Output (MU-MIMO), wherein the physical resources allocated by the Node B side refer to time-frequency resources.

In a Long Term Evolution (LTE) system, downlink physical Channel State Information (CSI) can by reflected by three ways: a Channel Quality Indicator (CQI), a Pre-coding Matrix Indicator (PMI) and a Rank Indicator (RI).

A CQI is an index for determining quality of a downlink channel. In an existing technology, a CQI is represented by integral values 0 to 15, representing different CQI levels respectively, different CQIs correspond to respective Modulation and Coding Schemes (MCSs), and there are totally 16 conditions which may be represented by 4-bit information.

A PMI refers to notifying an eNB of which pre-coding matrix is to be adopted for pre-coding a Physical Downlink Shared Channel (PDSCH) sent to UE according to measured channel quality in a closed loop space multiplexing sending mode only. Feedback granularity of the PMI may be feeding back the PMI in the whole bandwidth, or may also be feeding back the PMI according to sub-bands.

An RI is for describing the number of spatial independent channels, and corresponding to a rank of a channel response matrix. UE is required to feed back RI information in open loop space multiplexing and closed loop space multiplexing modes, while is not required to feed back the RI information in other modes. The rank of the channel matrix corresponds to the number of layers, so that the RI information fed back to an eNB by the UE is the number of the layers for downlink transmission.

A transmission layer is a concept of "layer" under a multi-antenna condition in LTE and Long Term Evolution-Advanced (LTE-A), and represents the number of effective independent channels in space multiplexing. The total number of transmission layers is a rank of a spatial channel. In an SU-MIMO mode, resources of all antennae are allocated to the same user, and the number of layers for transmitting MIMO data is equal to the rank for transmitting the MIMO data by the eNB; and in an MU-MIMO mode, the number of layers for transmission corresponding to one user is smaller than the total number of the layers for transmitting the MIMO data by the eNB, and the eNB is required to notify different control data to the UE in different transmission modes for switching between the SU-MIMO mode and the MU-MIMO mode.

In a practical communication system, a Node B side may adopt multiple transmitting and receiving antennae, while there may usually not be many antennae configured on a terminal of a user side under the limits of a factor such as a size and cost of the terminal, which may cause incomplete utilization of advantages of a MIMO technology.

An uplink virtual MIMO method disclosed at present is to combine multiple users to form virtual MIMO channels in the same time-frequency resource to jointly send data to a Node B with multiple antennae. When a distance between the users is large enough, the channels for different users to reach the Node B may be considered to be uncorrelated, so that influence of the factors of the size and the cost is eliminated.

Virtual MIMO is divided into cooperative virtual MIMO and non-cooperative virtual MIMO. A main thought of cooperative virtual MIMO is that data may be shared between users and the antennae of respective users are shared to form a virtual multi-antenna system, and an existing uplink cooperative virtual MIMO technology mainly realizes a diversity function of MIMO; and non-cooperative virtual MIMO refers to that users may not share data but send independent data streams to a Node B respectively, the Node B selects some users for pairing according to channel conditions of the users, the paired users send data to the Node B in the same time-frequency resource, and the Node B distinguishes different users through multiple antennae, which is similar to that of downlink MU-MIMO, and non-cooperative virtual MIMO mainly realizes a multiplexing function of MIMO.

A virtual MIMO technology at the present stage is usually suggested for an uplink for a mobile terminal to send data to a Node B, and a non-cooperative manner is mainly adopted.

Device to Device (D2D) communication is a technology for direct communication between terminals, and its main characteristic is that a certain device in multiple close devices covered by a network may find the other devices in a wireless manner and realize direct connection and communication with the other devices. In D2D communication, resources are shared with cell users under the control of a cell network, so that a utilization rate of a frequency spectrum may be increased. In addition, D2D communication also has the advantages of: reducing a burden of a cellular network, reducing power consumption of a battery of a mobile terminal, increasing a bit rate, improving robustness of a failure of a network infrastructure and the like, and it may also support novel small-scale point-to-point data service.

A key thought of network coding is that an intermediate node in a network linearly or nonlinearly processes information received on each channel, and the adopted processing technologies may be non-binary field network coding, nested convolution network coding, distributed Low Density Parity Check (LDPC) network coding and the like. The principle of non-binary field network coding is that the intermediate node multiplies multiple pieces of received information by a coding matrix on a galois field to generate a linear information combination on a non-binary field; and non-binary field network coding saves transmission resources and improves data transmission reliability. A principle of nested convolution network coding is that each source node sends the intermediate node and other destination nodes after coding with independent convolution coding matrixes, the intermediate node performs network coding processing on the received information sent by each signal source and transmits the information to the destination nodes and the destination nodes decode the information by virtue of a Rate-Compatible Punctured Convolutional (RCPC) algorithm; and nested convolution network coding may greatly save transmission slots and improve system transmission efficiency. A principle of distributed LDPC network coding is that the intermediate node receives information sent by different source nodes and combines the information into information bits and the intermediate node performs LDPC coding on the information bits to generate check information and sends the check information to the destination nodes; and the distributed-type LDPC network coding may improve data transmission reliability.

Downlink virtual MIMO may allow sharing of receiving antennae of multiple users to form a virtual SU-MIMO receiver, and because of less interlayer interference, SU-MIMO may achieve higher link performance and higher downlink throughput compared with MU-MIMO, which is great for improving a communication condition of a hot spot with densely distributed users. However, downlink virtual MIMO is essentially cooperative virtual MIMO, and sharing of information received from a Node B between terminals and joint demodulation and decoding are required. Since an existing mobile communication network architecture does not support data sharing between users, two processes are required for data interaction between users: 1, each user sends data to a Node B through an uplink channel respectively; and 2, the Node B forwards the data to the users in downlink channels. In such interaction processes, the antenna data may not be effectively shared between the users, so that an existing downlink virtual MIMO technology is not used fully in a mobile communication system.

For the problem of incapability of an existing mobile communication network in effectively supporting a downlink virtual MIMO technology, there is yet no effective solution.

SUMMARY

In view of this, the embodiments of the present disclosure provide a method, apparatus and system for data transmission in a downlink virtual multi-antenna system, which may implement antenna sharing between users and improve a network congestion condition.

The technical solutions of the present disclosure are implemented as follows.

A method for data transmission in a downlink virtual multi-antenna system is provided, which includes:

N terminals receive downlink data and/or downlink Demodulation Reference Signals (DMRSs) from one Node B or multiple Nodes B, N being a positive integer larger than or equal to 2; and one terminal in the N terminals forwards the downlink data and/or downlink DMRSs received from the one Node B or multiple Nodes B to M terminal(s), M being a positive integer larger than or equal to 1.

Furthermore, the method may further include: the one terminal in the N terminals forwards the downlink data and/or downlink DMRSs received from the one Node B or multiple Nodes B to the M terminal(s) in the N terminals, M being a positive integer not larger than N.

Furthermore, the one terminal in the N terminals may be one of the N terminals or one of L terminal(s), the L terminal(s) form(s) a subset of the N terminals, and L is smaller than or equal to N and larger than or equal to 1.

Furthermore, the method may further include: the one terminal in the N terminals forwards the downlink data and downlink DMRSs received from the one Node B or multiple Nodes B to another terminal in the N terminals.

Furthermore, the method may further include: the one terminal in the N terminals forwards the downlink data and downlink DMRSs received from the one Node B or multiple Nodes B to another terminal except the N terminals.

Furthermore, the another terminal except the N terminals may be a centralized processing device not connected to a current mobile communication network.

Furthermore, the method may further include: after the one terminal in the M terminal(s) receives the downlink data and/or downlink DMRSs of the one Node or multipleNodes B from the L terminal(s), the one terminal in the M terminal(s) jointly demodulates and/or decodes data of each part based on data and/or DMRSs the one terminal in the M terminal(s) has had to obtain data to be sent to the one terminal in the M terminal(s) by the one Node B or multiple Nodes B.

Furthermore, the method may further include: after the one terminal in the N terminals receives the downlink data and/or downlink DMRSs of the one Node B or multiple Nodes B from other terminal(s) in the N terminals, the one terminal in the N terminals jointly demodulates and/or decodes data of each part based on data and/or DMRSs the one terminal in the N terminals has had to obtain data that is to be sent by the one Node B or multiple Nodes B to the one terminal and the other terminal(s) in the N terminals, and forwards the data to be sent to the other terminal(s) in the N terminals to the other terminal(s) in the N terminals.

Furthermore, the method may further include: after the one terminal in the N terminals receives the downlink data and/or downlink DMRSs of the one Node B or multiple Nodes B from other terminal(s) in the N terminals, the one terminal in the N terminals forwards data and/or DMRSs of the N terminals to the other terminal(s) in the N terminals, and the other terminal(s) in the N terminals jointly demodulate(s) and/or decode(s) data of each part to obtain data which is to be sent by the one Node B or multiple Nodes B to the other terminal(s).

Furthermore, the method may further include: after the another terminal except the N terminals receives the downlink data and/or downlink DMRSs of the one Node B or multiple Nodes B from the N terminals, the another terminal except the N terminals forwards the downlink data and/or downlink DMRSs to the N terminals; and the one terminal in the N terminals jointly demodulates and/or decodes data of each part based on data and/or DMRSs the one terminal in the N terminals has had and according to the downlink data and/or downlink DMRSs of the one Node B or multiple Nodes B received from the another terminal except the N terminals to obtain data which is to be sent to the one terminal in the N terminals by the one Node B or multiple Nodes B.

Furthermore, the method may further include: after the another terminal except the N terminals receives the downlink data and/or downlink DMRSs of the one Node B or multiple Nodes B from the N terminals, the another terminal except the N terminals performs network coding on the downlink data of the one Node B or multiple Nodes B to obtain network-coded data, and then forwards the network-coded data to the N terminals; and the one terminal in the N terminals performs network decoding to obtain the downlink data of the one Node B or multiple Nodes B according to the network-coded data received from the another terminal except the N terminals, and jointly demodulates and/or decodes data of each part to obtain data which is to be sent by the one Node B or multiple Nodes B to the one terminal in the N terminals.

A method for data transmission in a downlink virtual multi-antenna system is provided, which includes:

one terminal forwards received downlink data and/or downlink DMRS of a Node B to M terminal(s), M being a positive integer larger than or equal to 1.

Furthermore, the method may further include: the one terminal forwards downlink data and/or downlink DMRS from other terminal(s) or centralized processing device(s) to other M terminal(s).

An apparatus for data transmission in a downlink virtual multi-antenna system is provided, which includes:

a first receiving unit, configured to receive downlink data and/or downlink DMRSs from one Node B or multiple Nodes B by N terminals, N being a positive integer larger than or equal to 2; and a first forwarding unit, configured to forward the downlink data and/or downlink DMRSs received from the one Node B or multiple Nodes B to M terminal(s) by one terminal in the N terminals, M being a positive integer larger than or equal to 1.

When the first receiving unit and the first forwarding unit execute processing, they are implemented by a Central Processing Unit (CPU), a Digital Signal Processor (DSP) or a Field-Programmable Gate Array (FPGA).

Furthermore, the first forwarding unit may be further configured to forward the downlink data and/or downlink DMRSs received from the one Node B or multiple Nodes B to M terminal(s) in the N terminals by one terminal in the N terminals, M being a positive integer not larger than N.

Furthermore, the one terminal in the N terminals may be one of the N terminals or one of L terminal(s), the L terminal(s) form(s) a subset of the N terminals, and L is smaller than or equal to N and larger than or equal to 1.

Furthermore, the first forwarding unit may be further configured to forward the downlink data and downlink DMRSs received from the one Node B or multiple Nodes B to another terminal in the N terminals by the one terminal in the N terminals.

Furthermore, the first forwarding unit may be further configured to forward the downlink data and downlink DMRSs received from the one Node B or multiple Nodes B to another terminal except the N terminals by the one terminal in the N terminals.

Furthermore, the another terminal except the N terminals may be a centralized processing device not connected to a current mobile communication network.

An apparatus for data transmission in a downlink virtual multi-antenna system is provided, which includes:

a second receiving unit, configured to receive downlink data and/or downlink DMRS from a Node B by one terminal; and a second forwarding unit, configured to forward the downlink data and/or downlink DMRS received from the Node B to M terminal(s) by the one terminal, M being a positive integer larger than or equal to 1.

Furthermore, the second receiving unit may be further configured to receive downlink data and/or downlink DMRS from other terminal(s) or centralized processing device(s) by the one terminal; and the second forwarding unit may be configured to forward the downlink data and/or downlink DMRS from the other terminal(s) or the centralized processing device(s) to other M terminal(s) by the one terminal.

Furthermore, the apparatus may further include a decoding unit, configured for the one terminal in the M terminal(s) to, after the one terminal in the M terminal(s) receives the downlink data and/or downlink DMRS of the Node B from L terminal(s), jointly demodulate and/or decode the data of each part by the one terminal in the M terminal(s) based on data and/or DMRS the one terminal in the M terminal(s) has had to obtain data to be sent to the terminal by the Node B, wherein the L terminal(s) form(s) a subset of N terminals, and N is a positive integer larger than or equal to 2.

Furthermore, the apparatus may further include a decoding unit, configured for the one terminal in the N terminals to, after the one terminal in the N terminals receives the downlink data and/or downlink DMRS of the Node B from the other terminal(s) in the N terminals, jointly demodulate and/or decode data of each part based on data and/or DMRS the one terminal in the N terminals has had to obtain data that is to be sent to the one terminal and the other terminal(s) in the N terminals by the Node B, and forward the data that is to be sent to the other terminal(s) in the N terminals to the other terminal(s) in the N terminals; and N is a positive integer larger than or equal to 2.

Furthermore, the apparatus may further include a decoding unit, configured to, after the one terminal in the N terminals receives the downlink data and/or downlink DMRS of the Node B from the other terminal(s) in the N terminals, forward data and/or DMRS of the N terminals by the one terminal in the N terminals to the other terminal(s) in the N terminals, and jointly demodulate and/or decode the data of each part by the other terminal(s) in the N terminals to obtain data that is to be sent to the other terminal(s) by the Nodes B; and N is a positive integer larger than or equal to 2.

Furthermore, the apparatus may further include a decoding unit, configured to, after one terminal except the N terminals receives the downlink data and/or downlink DMRS of the Node B from the N terminals, forward the downlink data and/or the downlink DMRS by the one terminal except the N terminals to the N terminals; and configured to jointly demodulate and/or decode data of each part by the one terminal in the N terminals based on data and/or DMRS the one terminal in the N terminals has had and according to the downlink data and/or downlink DMRS of the Node B received from the another terminal except the N terminals to obtain data that is to be sent by the Node B to the one terminal in the N terminals; and N is a positive integer larger than or equal to 2.

Furthermore, the apparatus may further include a decoding unit, configured to, after one terminal except the N terminals receives the downlink data and/or downlink DMRS of the Node B from the N terminals, perform network coding on the downlink data of the Node B to obtain network-coded data, then forward the network-coded data to the N terminals the one terminal except the N terminals; and configured to perform network decoding by the one terminal in the N terminals to obtain the downlink data of the Node B according to the network-coded data received from the one terminal except the N terminals, and jointly demodulate and/or decode data of each part to obtain data that is to be sent by the Node B to the one terminal in the N terminals; and N is a positive integer larger than or equal to 2.

When the second receiving unit, the second forwarding unit and the decoding unit execute processing, they are implemented by a CPU, a DSP or an FPGA.

A downlink virtual multi-antenna system is provided, which includes:

a first forwarding unit, configured to forward downlink data and/or downlink DMRS of a Node B that are/is received from one terminal in N terminals to M terminal(s), M being a positive integer larger than or equal to 1; and a second receiving unit, configured to receive downlink data and/or downlink DMRS from other terminal(s) or centralized processing device(s) by one terminal.

When the first forwarding unit and the second receiving unit execute processing, they are implemented by a CPU, a DSP or an FPGA.

According to the method of the embodiment of the present disclosure, N terminals receive downlink data and/or downlink DMRSs from one Node B or multiple Nodes B, N being a positive integer larger than or equal to 2; and one terminal in the N terminals forwards the downlink data and/or downlink DMRSs received from the one Node B or multiple Nodes B to M terminal(s), M being a positive integer larger than or equal to 1.

By the embodiments of the present disclosure, one terminal in the N terminals forwards the downlink data and/or downlink DMRSs received from the one Node B or multiple Nodes B to M terminal(s) for data interaction between terminals, so that antenna sharing between users may be achieved and a network congestion condition may be improved.

DETAILED DESCRIPTION

For the problem of incapability of an existing mobile communication network in effectively supporting a downlink virtual MIMO technology, the present disclosure discloses a novel signalling transmission solution for a virtual multi-antenna system, so as to effectively implement antenna sharing between users, increase data throughput of a hot spot and improve a network congestion condition by fully utilizing the downlink virtual MIMO technology.

Implementation of the technical solutions is further described below with reference to the drawings in detail.

An embodiment of the present disclosure mainly includes the following contents.

Figure 2:
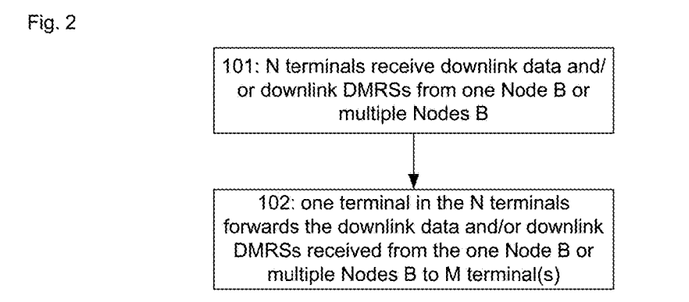
FIG. 2 is an implementation flowchart of a principle of a method according to the present disclosure.

As shown in FIG. 2, a principle flow of a method for data transmission in a downlink virtual multi-antenna system according to the embodiment of the present disclosure includes:

Step 101: N terminals receive downlink data and/or downlink DMRSs from one Node B or multiple Nodes B;

here, N is a positive integer larger than or equal to 2; and

Step 102: one terminal in the N terminals forwards the downlink data and/or downlink DMRSs received from the one Node B or multiple Nodes B to M terminal(s).

Here, M is a positive integer larger than or equal to 1.

Preferably, under the condition that the M terminal(s) are distributed within the N terminals, one terminal in the N terminals forwards the downlink data and/or downlink DMRSs received from the one Node B or multiple Nodes B to the M terminal(s) in the N terminals, wherein M is a positive integer not larger than N.

Preferably, one terminal in the N terminals is one of the N terminals or one of L terminal(s), wherein the L terminal(s) form(s) a subset of the N terminals. L is smaller than or equal to N and larger than or equal to 1.

Preferably, under the condition that the M terminal(s) are centralized, online and included in the N terminals, one terminal in the N terminals forwards the downlink data and downlink DMRSs received from the one Node B or multiple Nodes B to another terminal in the N terminals.

Preferably, under the condition that the M terminal(s) are centralized, offline and excluded from the N terminals, one terminal in the N terminals forwards the downlink data and downlink DMRSs received from the one Node B or multiple Nodes B to another terminal except the N terminals.

Preferably, the another terminal except the N terminals may also be a centralized processing device not connected to a mobile communication network. The centralized processing device may be a conventional mobile or fixed station device with a capability of communication with a Node B, and may also be an ordinary centralized data processing device, including, but not limited to, a device in form of a relay and wireless access point, a small Node B, a home Node B or the like.

Preferably, the another terminal except the N terminals performs network coding on the data sent from the N terminals, and then sends the coded data to the N terminals.

The above is an interaction process, and after the interaction process, there may be a decoding process as follows.

Preferably, the method further includes: after receiving the downlink data and/or downlink DMRSs of the Nodes B from the L terminal(s), one terminal in the M terminal(s) jointly demodulates and/or decodes the data of each part based on data and/or DMRSs the one terminal in the M terminal(s) has had to obtain the data to be sent to the terminal by the one or multiple Nodes B.

Preferably, the method further includes: after receiving the downlink data and/or downlink DMRSs of the one or multiple Nodes B from other terminal(s) in the N terminals, one terminal in the N terminals jointly demodulates and/or decodes the data of each part based on the data and/or DMRSs the one terminal in the N terminals has had to obtain the data to be sent by the one or multiple Nodes B to the terminal and the other terminal(s) in the N terminals, and forwards the data to be sent to the other terminal(s) in the N terminals to the other terminal(s) in the N terminals.

Preferably, the method further includes: after receiving the downlink data and/or downlink DMRSs of the one or multiple Nodes B from the other terminal(s) in the N terminals, one terminal in the N terminals forwards the data and/or DMRSs of the N terminals to the other terminal(s) in the N terminals, and the other terminal(s) in the N terminals jointly demodulate and/or decode the data of each part to obtain the data to be sent to the other terminal(s) by the one or multiple Nodes B.

Preferably, the method further includes: after receiving the downlink data and/or DMRSs of the one or multiple Nodes B from the N terminals, the another terminal except the N terminals forwards the downlink data and/or DMRSs to the N terminals; and one terminal in the N terminals jointly demodulates and/or decodes the data of each part based on the data and/or DMRSs the one terminal in the N terminals has had and according to the downlink data and/or DMRSs of the one or multiple Nodes B received from the another terminal except the N terminals to obtain the data to be sent to the one terminal in the N terminals by the one or multiple Nodes B.

Preferably, the method further includes: after receiving the downlink data and/or downlink DMRSs of the one or multiple Nodes B from the N terminals, the another terminal except the N terminals performs network coding on the downlink data of the one or multiple Nodes B to obtain network-coded data, and then forwards the network-coded data to the N terminals; and one terminal in the N terminals performs network decoding to obtain the downlink data of the one or multiple Nodes B according to the network-coded data received from the another terminal except the N terminals, and jointly demodulates and/or decodes the data of each part to obtain the data to be sent by the one or multiple Nodes B to the one terminal in the N terminals.

A method for data transmission in a downlink virtual multi-antenna system according to an embodiment of the present disclosure includes:

one terminal forwards received downlink data and/or downlink DMRS of a Node B to M terminal(s), M being a positive integer larger than or equal to 1.

Preferably, the method further includes: the one terminal forwards downlink data and/or downlink DMRS from other terminal(s) or centralized processing device(s) to the other M terminal(s).

An apparatus for data transmission in a downlink virtual multi-antenna system according to an embodiment of the present disclosure includes:

a first receiving unit, configured to receive downlink data and/or downlink DMRSs from one Node B or multiple Nodes B by N terminals, N being a positive integer larger than or equal to 2; and a first forwarding unit, configured to forward the downlink data and/or downlink DMRSs received from the one Node B or multiple Nodes B to M terminal(s) by one terminal in the N terminals, M being a positive integer larger than or equal to 1.

Preferably, the first forwarding unit is further configured to forward the downlink data and/or downlink DMRSs received from the one Node B or multiple Nodes B to M terminal(s) in the N terminals by one terminal in the N terminals, M being a positive integer not larger than N.

Preferably, one terminal in the N terminals is one of the N terminals or one of L terminal(s), the L terminal(s) form(s) a subset of the N terminals, and L is smaller than or equal to N and larger than or equal to 1.

Preferably, the first forwarding unit is further configured to forward the downlink data and downlink DMRSs received from the one Node B or multiple Nodes B to another terminal in the N terminals by one terminal in the N terminals.

Preferably, the first forwarding unit is further configured to forward the downlink data and downlink DMRSs received from the one Node B or multiple Nodes B to another terminal except the N terminals by one terminal in the N terminals.

Preferably, the another terminal except the N terminals is specifically a centralized processing device not connected to a current mobile communication network.

An apparatus for data transmission in a downlink virtual multi-antenna system according to an embodiment of the present disclosure includes:

a second receiving unit, configured to receive downlink data and/or downlink DMRS from a Node B by one terminal; and a second forwarding unit, configured to forward the received downlink data and/or downlink DMRS of the Node B to M terminal(s) by the one terminal, M being a positive integer larger than or equal to 1.

Preferably, the second receiving unit is further configured to receive downlink data and/or downlink DMRS from other terminal(s) or centralized processing device(s) by the one terminal; and the second forwarding unit is configured to forward the downlink data and/or downlink DMRS from the other terminal(s) or the centralized processing device(s) to other M terminal(s) by the one terminal.

A downlink virtual multi-antenna system includes:

a first forwarding unit, configured to forward received downlink data and/or downlink DMRS of a Node B to M terminal(s) by one terminal in N terminals, M being a positive integer larger than or equal to 1; and a second receiving unit, configured to receive downlink data and/or downlink DMRS from other terminal(s) or centralized processing device(s) by one terminal.

Preferably, the apparatus further includes a decoding unit, configured to, after one terminal in the M terminal(s) receives the downlink data and/or DMRS of the Node B from L terminal(s), jointly demodulate and/or decode the data of each part based on data and/or DMRS the one terminal in the M terminals has had to obtain the data to be sent to the one terminal in the M terminals by the Node B; and the L terminal(s) form(s) a subset of N terminals, and N is a positive integer larger than or equal to 2.

Preferably, the apparatus further includes a decoding unit, configured to, after one terminal in the N terminals receives the downlink data and/or DMRS of the Node B from the other terminal(s) in the N terminals, jointly demodulate and/or decode the data of each part based on the data and/or DMRS the one terminal in the N terminals has had to obtain the data to be sent to the one terminal and the other terminal(s) in the N terminals by the Node B, and forward the data to be sent to the other terminal(s) in the N terminals to the other terminal(s) in the N terminals; and N is a positive integer larger than or equal to 2.

Preferably, the apparatus further includes a decoding unit, configured to, after one terminal in the N terminals receives the downlink data and/or DMRS of the Node B from the other terminal(s) in the N terminals, forward the data and/or DMRS of the N terminals to the other terminal(s) in the N terminals, and jointly demodulate and/or decode the data of each part by the other terminal(s) in the N terminals to obtain the data to be sent to the other terminal(s) by the Nodes B; and N is a positive integer larger than or equal to 2.

Preferably, the apparatus further includes a decoding unit, configured to, after another terminal except the N terminals receives the downlink data and/or DMRS of the Node B from the N terminals, forward the downlink data and/or the DMRS by the another terminal except the N terminals to the N terminals, and jointly demodulate and/or decode the data of each part by the one terminal in the N terminals based on the data and/or DMRS the another terminal except the N terminals has had and according to the downlink data and/or DMRS of the Node B received from the another terminal except the N terminals to obtain the data to be sent to one terminal in the N terminals by the Node B; and N is a positive integer larger than or equal to 2.

Preferably, the apparatus further includes a decoding unit, configured to, after the another terminal except the N terminals receives the downlink data and/or DMRS of the Node B from the N terminals, perform network coding on the downlink data of the Node B to obtain network-coded data, then forward the network-coded data to the N terminals, perform network decoding by one terminal in the N terminals to obtain the downlink data of the Node B according to the network-coded data received from the another terminal except the N terminals, and jointly demodulate and/or decode the data of each part by one terminal in the N terminals to obtain the data to be sent by the Node B to the one terminal in the N terminals; and N is a positive integer larger than or equal to 2.

The present disclosure is specifically described with examples below.

Figure 1:
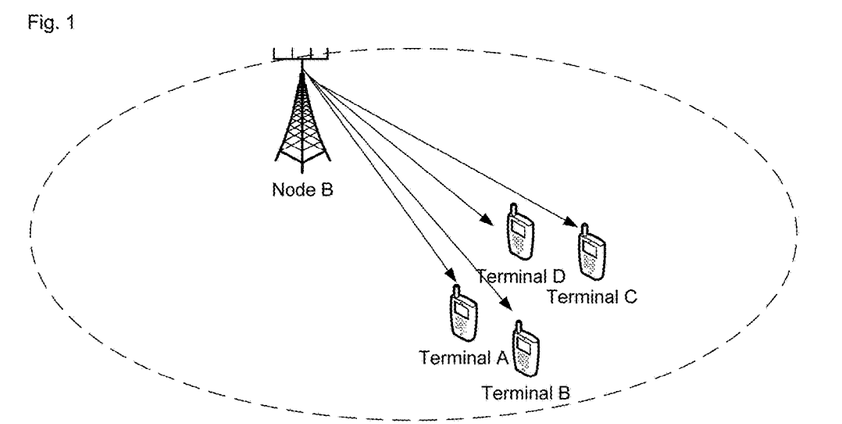
FIG. 1 is a diagram of downlink transmission in an existing homogeneous network.

As shown in FIG. 1, a Node B is to send downlink data to terminals A, B, C and D in a cell, and if an existing downlink transmission manner is adopted, the Node B needs to allocate different channel resources to A, B, C and D. In order to improve transmission efficiency, the Node B may adopt an SU-MIMO manner, that is, the Node B may send data to each terminal in multiple layers, and each terminal receives the downlink data on its own time-frequency resource respectively. The Node B may also adopt an MU-MIMO manner, that is, the Node B allocates the same time-frequency resource to multiple terminals, and for different terminals, the Node B adopt different pre-coding vectors (or matrixes) to make equivalent channels orthogonal. No matter whether SU-MIMO or MU-MIMO is adopted, data interaction between every two terminals is not required.

Figure 3:
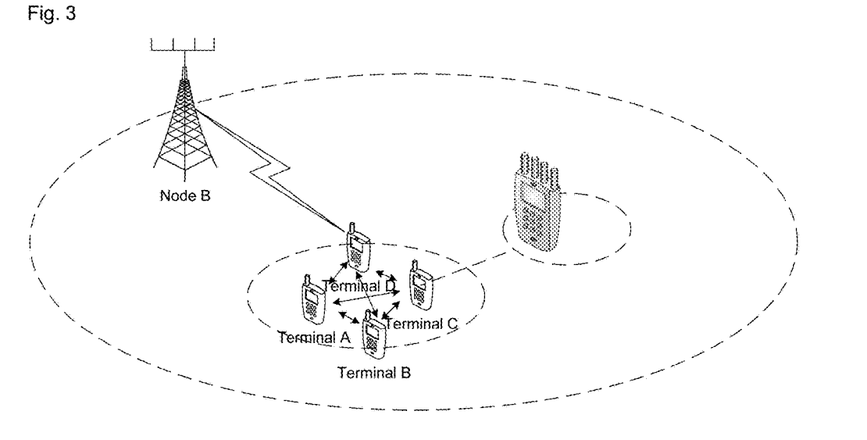
FIG. 3 is a diagram of a data transmission network architecture in method embodiments 1 to 4 according to the present disclosure.
Figure 8:
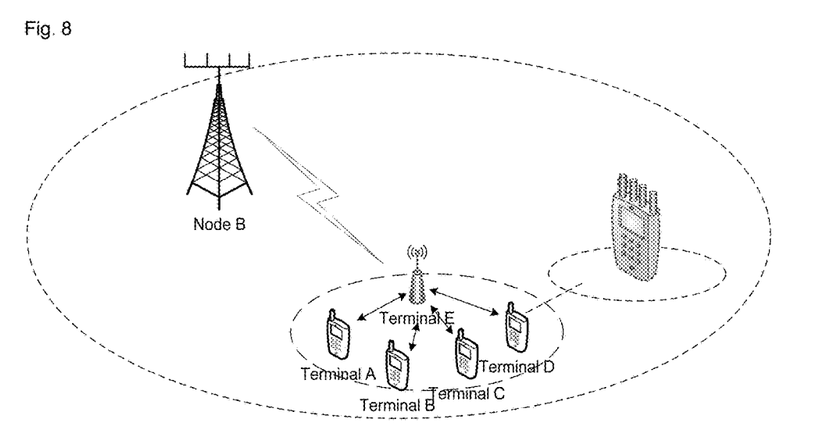
FIG. 8 is a diagram of a data transmission network architecture in method embodiments 5 to 7 according to the present disclosure.

However, a downlink virtual MIMO data transmission solution adopted in the present disclosure is greatly different from the existing two solutions, and is specifically described below. FIG. 3 is a diagram of a data transmission network architecture in method embodiments 1 to 4 according to the present disclosure, and FIG. 8 is a diagram of a data transmission network architecture in method embodiments 5 to 7 according to the present disclosure.

Embodiment 1:

N terminals receive downlink data and/or downlink DMRSs from one Node B or multiple Nodes B, wherein N is an integer larger than or equal to 2; and one terminal in the N terminals forwards the downlink data and/or downlink DMRSs received from the one Node B or multiple Nodes B to M terminal(s) in the N terminals, wherein M is a positive integer not larger than N.

One terminal in the N terminals is one of all the N terminals.

As shown in FIG. 3, in downlink virtual MIMO, terminals A, B, C and D jointly receive data from a Node B, that is, terminals A, B, C and D jointly form a virtual terminal to receive the downlink data from the Node B together, and the Node B transmits Data and/or DMRSs to A, B, C and D within the same time-frequency resource, wherein Data consists of four parts, i.e. $data_A$, $data_B$, $data_C$ and $data_D$, representing the data which is to be sent to terminals A, B, C and D by the Node B respectively.

Figure 4:
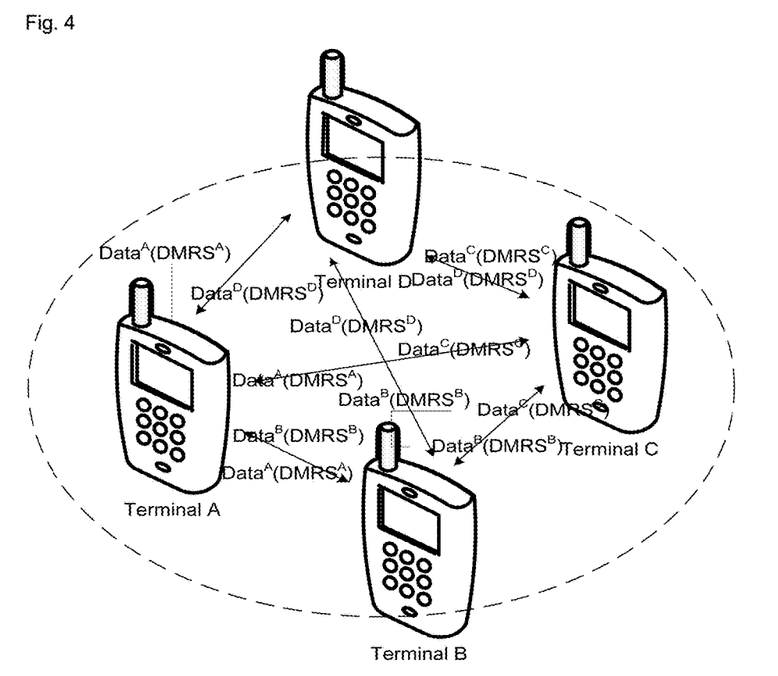
FIG. 4 is a diagram of data transmission between terminals in method embodiment 1 according to the present disclosure.

As shown in FIGS. 4, A, B, C and D sends the data received by their own receiving antennae to the other terminal(s) respectively, and for example, terminal A sends $Data^A$ and/or $DMRS^A$ to terminals B, C and D, wherein $Data^A$ represents a signal received on the antenna by terminal A, $DMRS^A$ is a DMRS received by terminal A, and $data^A$ and $DMRS^A$ may be analogue baseband signals, or may also be sampled and quantified digital signals. Similarly, terminal B sends $Data^B$ and/or $DMRS^B$ to terminals A, C and D, terminal C sends $Data^C$ and/or $DMRS^C$ to terminals A, B and D, and terminal D sends $Data^D$ and/or $DMRS^D$ to terminals A, B and C.

After receiving the data and/or DMRSs from the other terminal(s), each of terminals A, B, C and D jointly demodulates and (or) decodes the data of each part to obtain the data to be sent to each of the terminals A, B, C and D by the Node B based on the data and/or DMRS the each of the terminals A, B, C and D has had. For example, after receiving $Data^B$, $Data^C$ and $Data^D$ and/or $DMRS^B$, $DMRS^C$ and $DMRS^D$, terminal A jointly demodulates and decodes the data of the four parts based on $Data^A$ and/or $DMRS^A$ terminal A has had to obtain $data_A$ to be sent to terminal A by the Node B; and similarly, terminals B, C, and D jointly demodulate and decode $Data^A$, $Data^B$, $Data^C$ and $Data^D$ to obtain their own required $data_B$, $data_C$ and $data_D$ respectively.

The embodiment has the beneficial effects that: compared with SU-MIMO, the embodiment can obtain a higher diversity or multiplexing gain because the virtual receiving terminal formed by terminals A, B, C and D has more receiving antennae. For example, if SU-MIMO is adopted, the Node B may adopt at most one layer for transmission directed to each terminal because each of A, B, C and D has only one receiving antenna, while in the embodiment the Node B may adopt at most four layers for transmission because the virtual receiving terminal formed by A, B, C and D has four antennae. Therefore, the multiplexing gain is obviously increased. Compared with MU-MIMO, the embodiment has the advantage that in MU-MIMO, interference between users may be avoided only when equivalent channels between the users are strictly orthogonal, but it is often difficult to do so during a practical application, which may greatly reduce performance of MU-MIMO; while when downlink virtual MIMO of the present disclosure is adopted, interference between users is avoided, and performance higher than that of MU-MIMO is achieved.

Embodiment 2:

N terminals receive downlink data and/or downlink DMRSs from one Node B or multiple Nodes B, wherein N is an integer larger than or equal to 2; and one terminal in the N terminals forwards the downlink data and/or downlink DMRSs received from the one Node B or multiple Nodes B to M terminal(s) in the N terminals, wherein M is a positive integer not larger than N.

One terminal in the N terminals may be one of L terminal(s), wherein the L terminal(s) form(s) a subset of the N terminals.

As shown in FIG. 3, in the embodiment, terminal A is required to receive the downlink data from the Node B while terminals B, C and D are not required to receive the data from the Node B, and then terminals B, C and D may assist the terminal A to receive the data by a downlink virtual MIMO technology. A process is specifically as follows:

in downlink virtual MIMO, terminals A, B, C and D jointly receive the data and the DMRSs from the Node B, that is, terminals A, B, C and D jointly form a virtual terminal to receive the downlink data from the Node B together, and the Node B transmits Data and/or DMRSs to A, B, C and D within the same time-frequency resource, wherein Data only consists of $data_A$, and $data_A$ represents the data to be sent to terminal A by the Node B.

Figure 5:
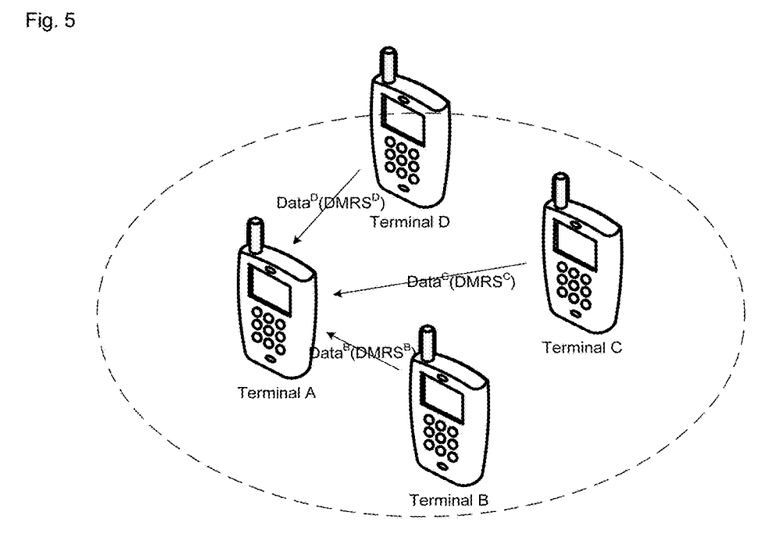
FIG. 5 is a diagram of data transmission between terminals in method embodiment 2 according to the present disclosure.

B, C and D send the data and/or DMRSs received on their own receiving antennae to terminal A. For example, terminal B sends $Data^B$ and/or $DMRS^B$ to terminal A, wherein $Data^B$ represents a signal received on the antenna by terminal B, $DMRS^B$ is a DMRS received by terminal B, and $Data^B$ and $DMRS^B$ may be analogue baseband signals, or may also be sampled and quantified digital signals. Similarly, terminal C sends $Data^C$ and/or $DMRS^C$ to terminal A, and terminal D sends $Data^D$ and/or $DMRS^D$ to terminal A, as shown in FIG. 5.

After receiving the data and/or DMRSs from the other terminals, terminal A jointly demodulates and (or) decodes the data of each part based on the data and/or DMRS terminal A has had to obtain the data to be sent to terminal A by the Node B. For example, after receiving $Data^B$, $Data^C$ and $Data^D$ and/or $DMRS^B$, $DMRS^C$ and $DMRS^D$, terminal A jointly demodulates and decodes the data of the four parts based on $Data^A$ and/or $DMRS^A$ terminal A has had to obtain $data_A$ to be sent to terminal A by the Node B.

The embodiment has the beneficial effects that: compared with SU-MIMO, the embodiment has the advantage that virtual MIMO may achieve a higher transmission gain compared with independent reception of terminal A over the downlink data of the Node B because the virtual receiving terminal formed by terminals A, B, C and D has more receiving antennae. For example, if SU-MIMO is adopted, the Node B may adopt at most one layer for transmission directed to terminal A because A has only one receiving antenna, while the Node B may adopt at most four layers for transmission because the virtual receiving terminal formed by A, B, C and D has four antennae. Therefore, the multiplexing gain is obviously increased. In addition, since the formed virtual receiving terminals has many antennae, a reception diversity technology may also be adopted to improve quality of link transmission from the Node B to terminal A to further increase the throughput. In MU-MIMO, users are required to be paired, and if only terminal A has downlink data but B, C and D do not have any downlink data, MU-MIMO may not be adopted. Compared with MU-MIMO, virtual MIMO has the advantage that terminals B, C and D in an idle state may assist the other terminal (terminal A in the embodiment) to transmit data, so that the throughput of the downlink data is effectively increased.

Embodiment 3:

N terminals receive downlink data and/or downlink DMRSs from one Node B or multiple Nodes B, wherein N is an integer larger than or equal to 2; and one terminal in the N terminals forwards the downlink data and/or downlink DMRSs received from the one Node B or multiple Nodes B to another terminal in the N terminals.

As shown in FIG. 3, in the embodiment, terminals A, B, C and D are all required to receive the downlink data from the Node B, and in downlink virtual MIMO, terminals A, B, C and D jointly receive the data from the Node B, that is, terminals A, B, C and D jointly form a virtual terminal to receive the downlink data from the Node B together, and the Node B transmits Data and/or DMRSs to A, B, C and D within the same time-frequency resource, wherein Data consists of four parts, i.e. $data_A$, $data_B$, $data_C$ and $data_D$, representing the data to be sent to terminals A, B, C and D by the Node B respectively.

Figure 6:
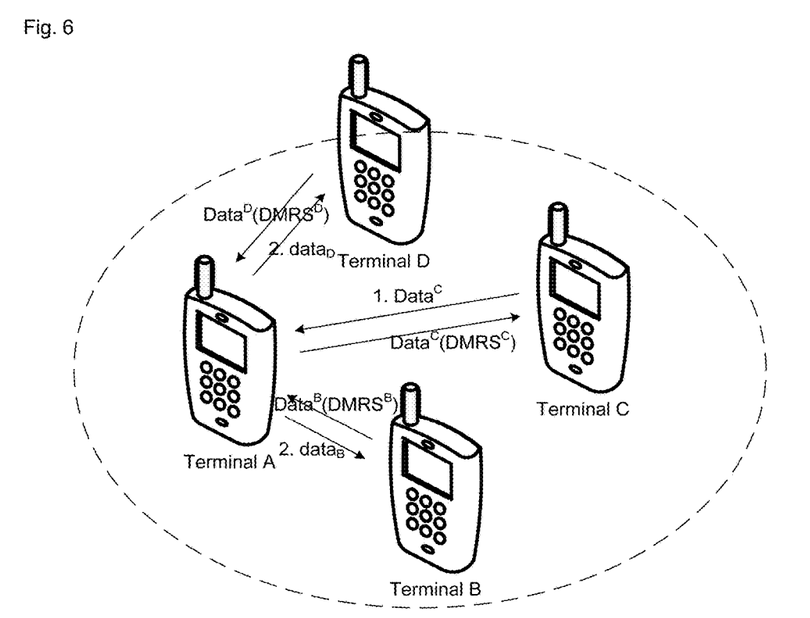
FIG. 6 is a diagram of data transmission between terminals in method embodiment 3 according to the present disclosure.

A process of data exchange between the terminals is shown in FIG. 6.

B, C and D send the data and/or DMRSs received on their own receiving antennae to terminal A, and for example, terminal B sends $Data^B$ and/or $DMRS^B$ to terminal A, wherein $Data^B$ represents a signal received on the antenna by terminal B, $DMRS^B$ is a DMRS received by terminal B, and $Data^B$ and $DMRS^B$ may be analogue baseband signals, or may also be sampled and quantified digital signals. Similarly, terminal C sends $Data^C$ and/or $DMRS^C$ to terminal A, and terminal D sends $Data^D$ and/or $DMRS^D$ to terminal A, as shown in FIG. 5.

After receiving the data and/or DMRSs from the other terminals, terminal A jointly demodulates and (or) decodes the data of each part based on the data and/or DMRS terminal A has had to obtain the data to be sent to terminal A and the other terminals by the Node B, and forwards the data to the other terminals. For example, after receiving $Data^B$, $Data^C$ and $Data^D$ and/or $DMRS^B$, $DMRS^C$ and $DMRS^D$, terminal A jointly demodulates and decodes the data of the four parts based on $Data^A$ and/or $DMRS^A$ terminal A has had to obtain $data_A$, $data_B$, $data_C$ and $data_D$ to be sent to terminals A, B, C and D by the Node B.

Then terminal A sends $data_B$, $data_C$ and $data_D$ to terminals B, C and D respectively.

The embodiment has the beneficial effects that: compared with SU-MIMO, the embodiment has the advantage that a higher diversity or multiplexing gain may be achieved because the virtual receiving terminal formed by terminals A, B, C and D has more receiving antennae. For example, if SU-MIMO is adopted, the Node B may adopt at most one layer for transmission directed to each terminal because each of A, B, C and D has only one receiving antenna, while the Node B may adopt at most four layers for transmission because the virtual receiving terminal formed by A, B, C and D has four antennae; and therefore, the multiplexing gain is obviously increased. Compared with MU-MIMO, the embodiment has the advantage that: in MU-MIMO, interference between users may be avoided only when equivalent channels between the users are strictly orthogonal, but it is often difficult to do so during a practical application, which may greatly reduce performance of MU-MIMO; while when downlink virtual MIMO of the present disclosure is adopted, interference between users is avoided, and performance higher than that of MU-MIMO is achieved. Centralized processing of A on the data of all the terminals may improve efficiency of data interaction between the terminals.

Embodiment 4:

N terminals receive downlink data and/or downlink DMRSs from one Node B or multiple Nodes B, wherein N is an integer larger than or equal to 2; and one terminal in the N terminals forwards the downlink data and/or downlink DMRSs received from the one Node B or multiple Nodes B to another terminal in the N terminals.

As shown in FIG. 3, in the embodiment, terminals A, B, C and D are all required to receive the downlink data from the Node B, and in downlink virtual MIMO, terminals A, B, C and D jointly receive the data from the Node B, that is, terminals A, B, C and D jointly form a virtual terminal to receive the downlink data from the Node B together, and the Node B transmits Data and/or DMRSs to A, B, C and D within the same time-frequency resource, wherein Data consists of four parts, i.e. $data_A$, $data_B$, $data_C$ and $data_D$, representing the data to be sent to terminals A, B, C and D by the Node B respectively.

Figure 7:
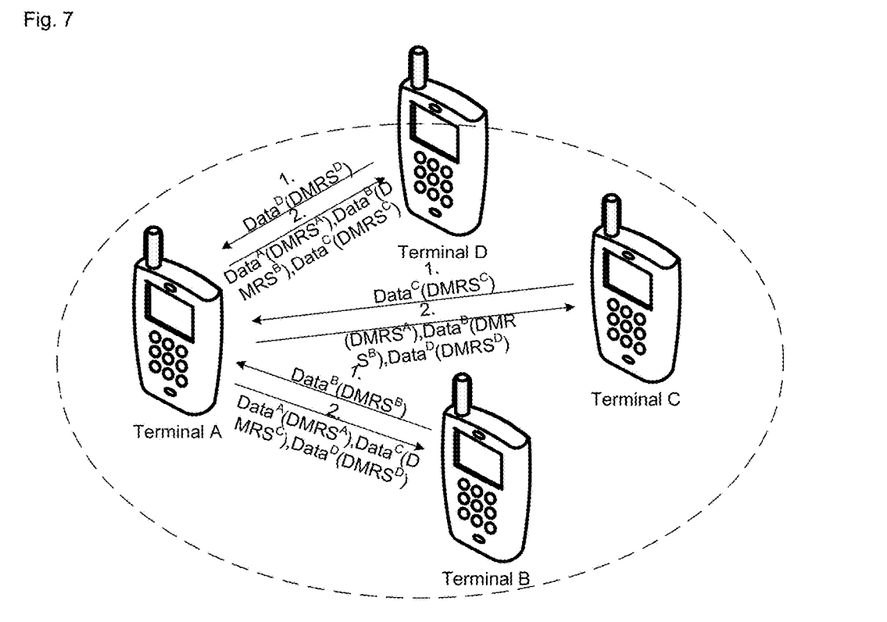
FIG. 7 is a diagram of data transmission between terminals in method embodiment 4 according to the present disclosure.

A process of data exchange between the terminals is shown in FIG. 7.

B, C and D send the data and/or DMRSs received on their own receiving antennae to terminal A, and for example, terminal B sends $Data^B$ and/or $DMRS^B$ to terminal A, wherein $Data^B$ represents a signal received by terminal B on the antenna, $DMRS^B$ is a DMRS received by terminal B, and $Data^B$ and $DMRS^B$ may be analogue baseband signals, or may also be sampled and quantified digital signals. Similarly, terminal C sends $Data^C$ and/or $DMRS^C$ to terminal A, and terminal D sends $Data^D$ and/or $DMRS^D$ to terminal A.

Terminal A forwards the received data and DMRSs and its own data and DMRS among the other terminals. For example, terminal A sends $Data^A$ and/or $DMRS^A$ to terminals B, C and D. Similarly, terminal A sends $Data^B$ and/or $DMRS^B$ to terminals C and D, terminal A sends $Data^C$ and/or $DMRS^C$ to terminals B and D, and terminal A sends $Data^D$ and/or $DMRS^D$ to terminals B and C.

After receiving the data and/or DMRSs of the other terminals from terminal A, each terminal jointly demodulates and (or) decodes the data of each part based on the data and/or DMRS the each terminal respectively has had, so as to obtain the data to be sent to the each terminal by the Node B. For example, after receiving $Data^A$, $Data^C$ and $Data^D$ and/or $DMRS^A$, $DMRS^C$ and $DMRS^D$, terminal B jointly demodulates and decodes the data of the four parts based on $Data^B$ and/or $DMRS^B$ terminal B has had to obtain $data_B$ to be sent to terminal B by the Node B; and similarly, terminals A, C and D jointly demodulate and decode $Data^A$, $Data^B$, $Data^C$ and $Data^D$ to obtain own required $data_A$, $data_C$ and $data_D$ respectively.

The embodiment has the beneficial effects that: compared with SU-MIMO, the embodiment has the advantage that a higher diversity or multiplexing gain may be achieved because the virtual receiving terminal formed by terminals A, B, C and D has more receiving antennae. For example, if SU-MIMO is adopted, the Node B may adopt at most one layer for transmission to each terminal because each of A, B, C and D has only one receiving antenna, while in the embodiment the Node B may adopt at most four layers for transmission because the virtual receiving terminal formed by A, B, C and D has four antennae; and therefore, the multiplexing gain is obviously increased. Compared with MU-MIMO, the embodiment has the advantage that in MU-MIMO, interference between users may be avoided only when equivalent channels between the users are strictly orthogonal, but it is often difficult to do so during a practical application, which may greatly reduce performance of MU-MIMO; while when downlink virtual MIMO of the present disclosure is adopted, interference between users is avoided, and performance higher than that of MU-MIMO is achieved. Centralized processing of A over the data of all the terminals may improve efficiency of data interaction between the terminals.

Embodiment 5:

N terminals receive downlink data and/or downlink DMRSs from one Node B or multiple Nodes B, wherein N is an integer larger than or equal to 2; and one terminal in the N terminals forwards the downlink data and/or downlink DMRSs received from the one Node B or multiple Nodes B to another terminal except the N terminals.

The another terminal except the N terminals may also be a centralized processor not connected to a mobile communication network.

As shown in FIG. 8, in the embodiment, terminals A, B, C and D are all required to receive the downlink data from the Node B while terminal E is not required to receive the data, and terminals A, B, C and D jointly receive the data from the Node B, that is, terminals A, B, C and D jointly form a virtual terminal to receive the downlink data from the Node B together, and the Node B transmits Data and/or DMRSs to A, B, C and D within the same time-frequency resource, wherein Data consists of four parts, i.e. $data_A$, $data_B$, $data_C$ and $data_D$, representing the data to be sent to terminals A, B, C and D by the Node B respectively.

Figure 9:
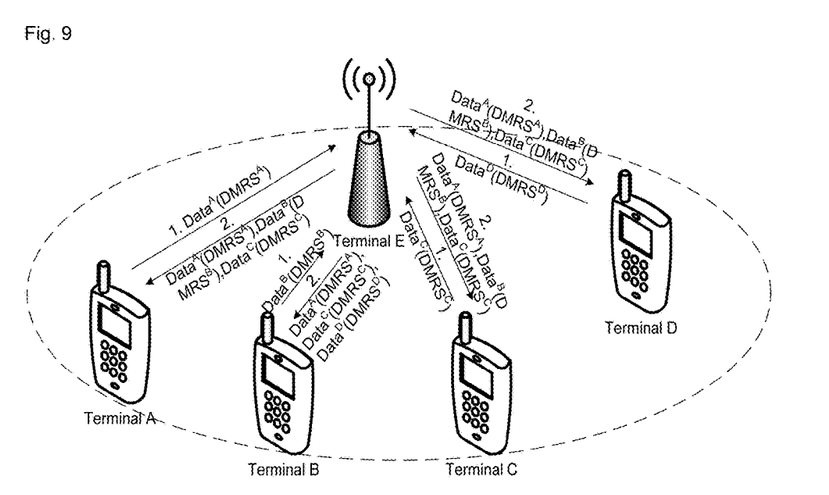
FIG. 9 is a diagram of data transmission between a terminal and an intermediate node in method embodiment 5 according to the present disclosure.

A process of data exchange between each terminal and an intermediate node is shown in FIG. 9.

A, B, C and D send the data and/or DMRSs received on their own receiving antennae to terminal E respectively, and for example, terminal A sends $Data^A$ and/or $DMRS^A$ to terminal E, wherein $Data^A$ represents a signal received by terminal A on the antenna, $DMRS^A$ is a DMRS received by terminal A, and $Data^A$ and $DMRS^A$ may be analogue baseband signals, or may also be sampled and quantified digital signals. Similarly, terminal B sends $Data^B$ and/or $DMRS^B$ to terminal E, terminal C sends $Data^C$ and/or $DMRS^C$ to terminal E, and terminal D sends $Data^D$ and/or $DMRS^D$ to terminal E.

Terminal E forwards the received data and/or DMRSs among the terminals. For example, terminal E sends $Data^A$ and/or $DMRS^A$ to terminals B, C and D. Similarly, terminal E sends $Data^B$ and/or $DMRS^B$ to terminals A, C and D, terminal E sends $Data^C$ and/or $DMRS^C$ to terminals A, B and D, and terminal E sends $Data^D$ and/or $DMRS^D$ to terminals A, B and C.

After receiving the data and/or DMRSs of the other terminals from terminal E, each of terminals A, B, C and D jointly demodulates and (or) decodes the data of each part based on the data and/or DMRS the each of terminals A, B, C and D respectively has had, so as to obtain the data to be sent to the each of terminals A, B, C and D terminal respectively by the Node B. For example, after receiving $Data^B$, $Data^C$ and $Data^D$ and/or $DMRS^B$, $DMRS^C$ and $DMRS^D$ from terminal E, terminal A jointly demodulates and decodes the data of the four parts based on $Data^A$ and/or $DMRS^A$ terminal A has had to obtain $data_A$ to be sent to terminal A by the Node B; and similarly, terminals B, C and D jointly demodulate and decode $Data^A$, $Data^B$, $Data^C$ and $Data^D$ to obtain their own required $data_B$, $data_C$ and $data_D$ respectively.

It is important to note that terminal E may be a conventional mobile or fixed station device with a capability of communication with a Node B, or may also be an ordinary centralized data processing device, including, but not limited to, a device in form of a relay, a wireless access point, small Node B, home Node B or the like.

The embodiment has the beneficial effects that: compared with SU-MIMO, the embodiment has the advantage that a higher diversity or multiplexing gain may be achieved because the virtual receiving terminal formed by terminals A, B, C and D has more receiving antennae. For example, if SU-MIMO is adopted, the Node B may adopt at most one layer for transmission to each terminal because each of A, B, C and D has only one receiving antenna, while in the embodiment the Node B may adopt at most four layers for transmission because the virtual receiving terminal formed by A, B, C and D has four antennae, therefore, the multiplexing gain is obviously increased. Compared with MU-MIMO, the embodiment has the advantage that: in MU-MIMO, interference between users may be avoided only when equivalent channels between the users are strictly orthogonal, but it is often difficult to do so during a practical application, which may greatly reduce performance of MU-MIMO; while when downlink virtual MIMO of the present disclosure is adopted, interference between users is avoided, and performance higher than that of MU-MIMO is achieved. Forwarding the data by terminal E may improve efficiency of data interaction among A, B, C and D.

Embodiment 6:

N terminals receive downlink data and/or downlink DMRSs from one Node B or multiple Nodes B, wherein N is an integer larger than or equal to 2; and one terminal in the N terminals forwards the downlink data and/or downlink DMRSs received from the one Node B or multiple Nodes B to another terminal except the N terminals.

As shown in FIG. 8, in the embodiment, terminals A, B, C and D are all required to receive the downlink data from the Node B while terminal E is not required to receive the data, and terminals A, B, C and D jointly receive the data from the Node B, that is, terminals A, B, C and D jointly form a virtual terminal to receive the downlink data from the Node B together, and the Node B transmits Data and/or DMRSs to A, B, C and D within the same time-frequency resource, wherein Data consists of four parts, i.e. $data_A$, $data_B$, $data_C$ and $data_D$, representing the data to be sent to terminals A, B, C and D by the Node B respectively.

Figure 10:
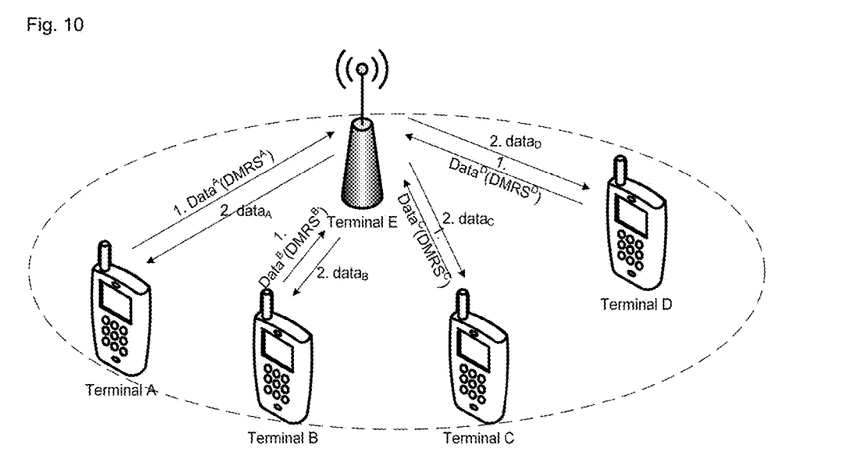
FIG. 10 is a diagram of data transmission between a terminal and an intermediate node in method embodiment 6 according to the present disclosure.

A process of data exchange between each terminal and an intermediate node is shown in FIG. 10.

A, B, C and D send the data and/or DMRSs received on their own receiving antennae to terminal E respectively, and for example, terminal A sends $Data^A$ and/or $DMRS^A$ to terminal E, wherein $Data^A$ represents a signal received on the antenna by terminal A, $DMRS^A$ is a DMRS received by terminal A, and $Data^A$ and $DMRS^A$ may be analogue baseband signals, or may also be sampled and quantified digital signals. Similarly, terminal B sends $Data^B$ and/or $DMRS^B$ to terminal E, terminal C sends $Data^C$ and/or $DMRS^C$ to terminal E, and terminal D sends $Data^D$ and/or $DMRS^D$ to terminal E.

After receiving the data and the DMRSs from terminals A, B, C and D, terminal E jointly demodulates and (or) decodes the data of each part to obtain the data to be sent to each terminal by the Node B. For example, after receiving $Data^A$, $Data^B$, $Data^C$ and $Data^D$ and $DMRS^A$, $DMRS^B$, $DMRS^C$ and $DMRS^D$, terminal E jointly demodulates and decodes the data of the four parts to obtain $data_A$, $data_B$, $data_C$ and $data_D$ which are to be sent by the Node B to terminals A, B, C and D.

Terminal E sends $data_A$, $data_B$, $data_C$ and $data_D$ to terminals A, B, C and D respectively.

It should noted that terminal E may be a conventional mobile or fixed station device with a capability of communication with a Node B, or may also be an ordinary centralized data processing device, including, but not limited to, a device in form of a relay, a wireless access point, small Node B, home Node B or the like.

Besides the common beneficial effects of downlink virtual MIMO in the abovementioned embodiments, this embodiment further has the beneficial effect that: the solution of the embodiment may further improve efficiency of data exchange through terminal E among A, B, C and D because data volumes of $data_A$, $data_B$, $data_C$ and $data_D$ are usually smaller than those of $Data^A$, $Data^B$, $Data^C$ and $Data^D$.

Embodiment 7:

N terminals receive downlink data and/or downlink DMRSs from one Node B or multiple Nodes B, wherein N is an integer larger than or equal to 2; and one terminal in the N terminals forwards the downlink data and/or downlink DMRSs received from the one Node B or multiple Nodes B to another terminal except the N terminals.

The another terminal except the N terminals may also be a centralized processor not connected to a mobile communication network.

The another terminal except the N terminals perform network coding on the data received from the N terminals, then forward the network-coded data to the N terminals.

As shown in FIG. 8, in the embodiment, terminals A, B, C and D are all required to receive the downlink data from the Node B while terminal E is not required to receive the data, and terminals A, B, C and D jointly receive the data from the Node B, that is, terminals A, B, C and D jointly form a virtual terminal to receive the downlink data from the Node B together, and the Node B transmits Data and/or DMRSs to A, B, C and D within the same time-frequency resource, wherein Data consists of four parts, i.e. $data_A$, $data_B$, $data_C$ and $data_D$, representing the data to be sent to terminals A, B, C and D by the Node B respectively.

Figure 11:
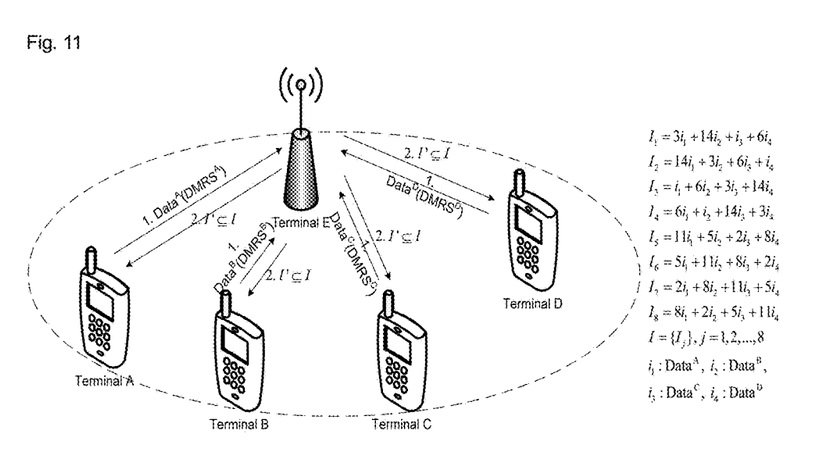
FIG. 11 is a diagram of data transmission between a terminal and an intermediate node in method embodiment 7 according to the present disclosure.

A process of data exchange between terminals and an intermediate node is shown in FIG. 11.

A, B, C and D send the data and/or DMRSs received on their own receiving antennae to terminal E respectively, and for example, terminal A sends $Data^A$ and/or $DMRS^A$ to terminal E, wherein $Data^A$ represents a signal received on the antenna by terminal A, $DMRS^A$ is a DMRS received by terminal A, and $Data^A$ and $DMRS^A$ may be analogue baseband signals, or may also be sampled and quantified digital signals. Similarly, terminal B sends $Data^B$ and/or $DMRS^B$ to terminal E, terminal C sends $Data^C$ and/or $DMRS^C$ to terminal E, and terminal D sends $Data^D$ and/or $DMRS^D$ to terminal E.

Terminal E performs network coding on the received data, and sends the network-coded data to terminals A, B, C and D. For example, terminal E performs non-binary field network coding on $Data^A$, $Data^B$, $Data^C$ and $Data^D$, and sends the coded data to terminals A, B, C and D. A non-binary field network coding method is as follows:

terminal E multiplies received $Data^A$, $Data^B$, $Data^C$ and $Data^D$ by a non-binary field coding matrix to generate different network-coded datasets. For example, terminal E multiplies the data by a network coding matrix on a galois field $GF(2^4)$:

$$\begin{pmatrix} 3 & 14 & 1 & 6 & 11 & 5 & 2 & 8 \\ 14 & 3 & 6 & 1 & 5 & 11 & 8 & 2 \\ 1 & 6 & 3 & 14 & 2 & 8 & 11 & 5 \\ 6 & 1 & 14 & 3 & 8 & 2 & 5 & 11 \end{pmatrix}$$

Terminal E obtains multiple groups of network-coded data, respectively: $3i_1+14i_2+i_3+6i_4$, $14i_1+3i_2+6i_3+i_4$, $i_1+6i_2+3i_3+14i_4$, $6i_1+i_2+14i_3+3i_4$, $11i_1+5i_2+2i_3+8i_4$, $5i_1+11i_2+8i_3+2i_4$, $2i_1+8i_2+11i_3+5i_4$ and $8i_1+2i_2+5i_3+11i_4$, wherein $i_1$, $i_2$, $i_3$ and $i_4$ represent data bit sequences of Data$^A$, Data$^B$, Data$^C$ and Data$^D$ respectively. Terminal E sends all or part of the network-coded data according to a channel condition of each terminal, and terminal E may send the network-coded data to A, B, C and D on the same channel in a multicast manner.

Terminals A, B, C and D receive the network-coded data from terminal E, and each terminal may finish decoding the network-coded data as long as any three groups of broadcast information are correctly received. For example: the network-coded data correctly received by terminal A are $3i_1+14i_2+i_3+6i_4$, $14i_1+3i_2+6i_3+i_4$ and $i_1+6i_2+3i_3+14i_4$ respectively, and terminal A knows data $i_1$(Data$^A$) sent by itself, so that terminal A may decode data $i_2$(Data$^B$), $i_3$(Data$^C$) and $i_4$(Data$^D$) of terminals B, C and D by the three pieces of network-coded data. Processing conditions of the other terminals are similar.

Each of terminals A, B, C and D jointly demodulates and (or) decodes the data of each part to obtain the data to be sent to the each of the terminals A, B, C and D by the Node B. For example, terminal A jointly demodulates and decodes Data$^A$, Data$^B$, Data$^C$ and Data$^D$ to obtain data$_A$ to be sent to terminal A by the Node B; and similarly, terminals B, C and D jointly demodulate and decode Data$^A$, Data$^B$, Data$^C$ and Data$^D$ to obtain own required data$_B$, data$_C$ and data$_D$.

It should noted that terminal E may be a conventional mobile or fixed station device with a capability of communication with a Node B, or may also be an ordinary centralized data processing device, including, but not limited to, a device in form of a relay, a wireless access point, small Node B, home Node B or the like. In addition, only adoption of the non-binary field network coding method for a data forwarding process of the terminals is listed in the embodiment, and actually, adoption of other network coding methods may also achieve effects the same as those achieved by the embodiment, and will not be repeated here.

Besides the beneficial effects of embodiment 5 and the common beneficial effects of downlink virtual MIMO in the abovementioned embodiments, this embodiment further has the beneficial effect that the efficiency of data interaction among terminals A, B, C and D is further improved because of the adoption of a network coding technology for the centralized processor (terminal E).

It should be noted that the virtual receiving terminal is formed by terminals A, B, C and D in the abovementioned embodiments, but there are no limits to the number of the terminals in the present disclosure, and the solutions of the present disclosure may be adopted under the condition of any number of terminals, which shall thus be considered as embodiments based on the spirit and essence of the present disclosure.

The above are only the preferred embodiments of the present disclosure and not intended to limit the scope of protection of the present disclosure.

INDUSTRIAL APPLICABILITY

By the embodiment of the present disclosure, one terminal in N terminals forwards received downlink data and/or DMRSs of a Nodes B to M terminal(s) for data interaction among the terminals, so that antenna sharing between users may be implemented, and a network congestion condition may be improved.

What is claimed is:

1. A method for data transmission in a downlink virtual multi-antenna system, comprising:
   receiving, by N terminals, downlink data and downlink Demodulation Reference Signals (DMRSs) from one Node B or multiple Nodes B, N being a positive integer larger than or equal to 2; and
   forwarding, by one terminal in the N terminals, the downlink data and downlink DMRSs received from the one Node B or multiple Nodes B to M terminal(s), M being a positive integer larger than or equal to 1,
   forwarding, by the one terminal in the N terminals, the downlink data and downlink DMRSs received from the one Node B or multiple Nodes B to the M terminal(s)in the N terminals, M being a positive integer not larger than N;
   forwarding, by the one terminal in the N terminals, the downlink data and downlink DMRSs received from the one Node B or multiple Nodes B to another terminal except the N terminals;
   after the another terminal except the N terminals receives the downlink data and downlink DMRSs of the one Node B or multiple Nodes B from the N terminals, forwarding, by the another terminal except the N terminals, the downlink data and downlink DMRSs to the N terminals; and
   jointly demodulating and decoding, by the one terminal in the N terminals, data of each part based on data and DMRSs the one terminal in the N terminals has had and according to the downlink data and downlink DMRSs of the one Node B or multiple Nodes B received from the another terminal except the N terminals to obtain data which is to be sent to the one terminal in the N terminals by the one Node B or multiple Nodes B.

2. The method according to claim 1, wherein the one terminal in the N terminals is one of the N terminals or one of L terminal(s), the L terminal(s) form(s) a subset of the N terminals, and L is smaller than or equal to N and larger than or equal to 1.

3. The method according to claim 2, further comprising: after the one terminal in the M terminal(s) receives the downlink data and downlink DMRSs of the one Node or multipleNodes B from L terminal(s), jointly demodulating and decoding, by the one terminal in the M terminal(s), data of each part based on data and DMRSs the one terminal in the M terminal(s) has had to obtain data which is to be sent to the one terminal in the M terminals by the one Node B or multiple Nodes B.

4. The method according to claim 1, further comprising: forwarding, by the one terminal in the N terminals, the downlink data and downlink DMRSs received from the one Node B or multiple Nodes B to another terminal in the N terminals.

5. The method according to claim 4, further comprising: after the one terminal in the N terminals receives the downlink data and downlink DMRSs of the one Node B or multiple Nodes B from other terminal(s) in the N terminals, jointly demodulating and decoding, by the one terminal in the N terminals, data of each part based on data and DMRSs the one terminal in the N terminals has had to obtain data which is to be sent by the one Node B or multiple Nodes B to the one terminal and the other terminal(s) in the N terminals, and forwarding the data to be sent to the other terminal(s) in the N terminals to the other terminal(s) in the N terminals.

6. The method according to claim 4, further comprising: after the one terminal in the N terminals receives the downlink data and downlink DMRSs of the one Node B or multiple Nodes B from other terminal(s) in the N terminals, forwarding, by the one terminal in the N terminals, data and DMRSs of the N terminals to the other terminal(s) in the N terminals, and jointly demodulating and decoding, by the other terminal(s) in the N terminals, data of each part to obtain data which is to be sent by the one Node B or multiple Nodes B to the other terminal(s).

7. The method according to claim 1, wherein the another terminal except the N terminals is a centralized processing device not connected to a current mobile communication network.

8. The method according to claim 1, further comprising: after the one terminal in the M terminal(s) receives the downlink data and downlink DMRSs of the one Node or multipleNodes B from L terminal(s), jointly demodulating and decoding, by the one terminal in the M terminal(s), data of each part based on data and DMRSs the one terminal in the M terminal(s) has had to obtain data which is to be sent to the one terminal in the M terminals by the one Node B or multiple Nodes B.

9. The method according to claim 1, further comprising:
after the another terminal except the N terminals receives the downlink data and downlink DMRSs of the one Node B or multiple Nodes B from the N terminals, performing, by the another terminal except the N terminals, network coding on the downlink data of the one Node B or multiple Nodes B to obtain network-coded data, and then forwarding the network-coded data to the N terminals; and
performing, by the one terminal in the N terminals, network decoding to obtain the downlink data of the one Node B or multiple Nodes B according to the network-coded data received from the another terminal except the N terminals, and jointly demodulating and decoding data of each part to obtain data which is to be sent by the one Node B or multiple Nodes B to the one terminal in the N terminals.

10. The method according to claim 1, further comprising: after the one terminal in the M terminal(s) receives the downlink data and downlink DMRSs of the one Node or multipleNodes B from L terminal(s), jointly demodulating and decoding, by the one terminal in the M terminal(s), data of each part based on data and/or DMRSs the one terminal in the M terminal(s) has had to obtain data which is to be sent to the one terminal in the M terminals by the one Node B or multiple Nodes B.

11. The method according claim 1, wherein forwarding, by the another terminal except the N terminals, the downlink data and downlink DMRSs to the N terminals comprises:
forwarding, by the another terminal except the N terminals, the downlink data and downlink DMRSs received from other terminals except the one terminal in the N terminals to the one terminal in the N terminals.

12. An apparatus for data transmission in a downlink virtual multi-antenna system, comprising:
a first receiving unit, configured to receive downlink data and downlink Demodulation Reference Signals (DMRSs) from one Node B or multiple Nodes B by N terminals, N being a positive integer larger than or equal to 2; and a first forwarding unit, configured to forward the downlink data and downlink DMRSs received from the one Node B or multiple Nodes B to M terminal(s) by one terminal in the N terminals, M being a positive integer larger than or equal to 1,
the first forwarding unit is further configured to forward the downlink data and downlink DMRSs received from the one Node B or multiple Nodes B to the M terminal(s) in the N terminals by the one terminal in the N terminals, M being a positive integer not larger than N;
wherein the first forwarding unit is further configured to forward the downlink data and downlink DMRSs received from the one Node B or multiple Nodes B to another terminal except the N terminals by the one terminal in the N terminals;
the first forwarding unit is further configured to after the another terminal except the N terminals receives the downlink data and downlink DMRSs of the one Node B or multiple Nodes B from the N terminals, forward the downlink data and downlink DMRSs to the N terminals-by the another terminal except the N terminals; and
the first forwarding unit is further configured to jointly demodulate and decode, by the one terminal in the N terminals, data of each part based on data and DMRSs the one terminal in the N terminals has had and according to the downlink data and downlink DMRSs of the one Node B or multiple Nodes B received from the another terminal except the N terminals to obtain data which is to be sent to the one terminal in the N terminals by the one Node B or multiple Nodes B.

13. The apparatus according to claim 12, wherein the one terminal in the N terminals is one of the N terminals or one of L terminal(s), the L terminal(s) form(s) a subset of the N terminals, and L is smaller than or equal to N and larger than or equal to 1.

14. The apparatus according to claim 12, wherein the first forwarding unit is further configured to forward the downlink data and downlink DMRSs received from the one Node B or multiple Nodes B to another terminal in the N terminals by the one terminal in the N terminals.

15. The apparatus according to claim 12, wherein the another terminal except the N terminals is a centralized processing device not connected to a current mobile communication network.

16. The apparatus according to claim 12, in order to forward the downlink data and downlink DMRSs to the N terminals by the another terminal except the N terminals, the first forwarding unit is further configured to:
forward the downlink data and downlink DMRSs received from other terminals except the one terminal in the N terminals to the one terminal in the N terminals by the another terminal except the N terminals.

17. A downlink virtual multi-antenna system, comprising:
a first forwarding unit, configured to forward downlink data and downlink Demodulation Reference Signal (DMRS) of a Node B that are received from one terminal in N terminals to M terminal(s), M being a positive integer larger than or equal to 1; and
the first forwarding unit is further configured to forward the downlink data and downlink DMRSs received from the one Node B or multiple Nodes B to the M terminal(s) in the N terminals by the one terminal in the N terminals, M being a positive integer not larger than N a second receiving unit, configured to receive downlink data and downlink DMRS from other terminal(s) or centralized processing device(s) by one terminals;

wherein the first forwarding unit is further configured to forward the downlink data and downlink DMRSs received from the one Node B or multiple Nodes B to another terminal except the N terminals by the one terminal in the N terminals;

the first forwarding unit is further configured to after the another terminal except the N terminals receives the downlink data and downlink DMRSs of the one Node B or multiple Nodes B from the N terminals, forward the downlink data and downlink DMRSs to the N terminals by the another terminal except the N terminals; and the first forwarding unit is further configured to jointly demodulate and decode, by the one terminal in the N terminals, data of each part based on data and DMRSs the one terminal in the N terminals has had and according to the downlink data and downlink DMRSs of the one Node B or multiple Nodes B received from the another terminal except the N terminals to obtain data which is to be sent to the one terminal in the N terminals by the one Node B or multiple Nodes B.

18. The system according to claim 17, in order to forward the downlink data and downlink DMRSs to the N terminals by the another terminal except the N terminals, the first forwarding unit is further configured to:

forward the downlink data and downlink DMRSs received from other terminals except the one terminal in the N terminals to the one terminal in the N terminals by the another terminal except the N terminals.

* * * * *